United States Patent [19]
Glenat et al.

[11] 3,735,246
[45] May 22, 1973

[54] SPIN-COUPLING NUCLEAR MAGNETIC RESONANCE MAGNETOMETER UTILIZING THE SAME COIL FOR EXCITATION AND SIGNAL PICK-UP AND USING TOROIDAL SAMPLES

[75] Inventors: Henri Glenat, Biviers; Antoine Salvi, Fontaine, both of France

[73] Assignee: Commissariat A L'Energie Atomique, Paris, France

[22] Filed: July 7, 1971

[21] Appl. No.: 160,277

[30] Foreign Application Priority Data

July 22, 1970    France................7027009

[52] U.S. Cl..................324/0.5 R, 324/0.5 E
[51] Int. Cl. ..................................G01r 33/08
[58] Field of Search..................324/0.5 E, 0.5 R

[56] References Cited

UNITED STATES PATENTS

| | | | |
|---|---|---|---|
| 3,441,838 | 4/1969 | Salvi | 324/0.5 E |
| 3,469,181 | 9/1969 | Staples | 324/0.5 E |
| 3,495,163 | 2/1970 | Salvi | 324/0.5 E |
| 3,501,690 | 3/1970 | Salvi et al. | 324/0.5 E |

*Primary Examiner*—Robert J. Corcoran
*Attorney*—William D. Stokes

[57] ABSTRACT

The magnetometer comprises two samples which are subjected to the field to be measured and contain the same atomic nuclei having a non-zero magnetic moment and kinetic moment ; two aligned coils each associated with a sample ; means for producing an electromagnetic field at the electron resonance frequency in order to saturate one line of one of the samples which increases energy absorption at the resonant frequency of the atomic nuclei and one line of the other sample so as to produce an energy emission at said resonant frequency ; a differential amplifier associated with two coils, each half-coil being connected to a fixed reference voltage and to a respective input of the amplifier, and means for measuring the frequency at the output of the amplifier.

11 Claims, 8 Drawing Figures

Patented May 22, 1973

INVENTORS
HENRI GLENAT
ANTOINE SALVI

BY William D. Stryker
ATTORNEY

Patented May 22, 1973

INVENTORS
HENRI GLENAT
ANTOINE SALVI

BY William D. Stokes
ATTORNEY

Patented May 22, 1973 3,735,246

INVENTORS
HENRI GLENAT
ANTOINE SALVI

BY William D. Stokes
ATTORNEY 3,735,246

SPIN-COUPLING NUCLEAR MAGNETIC RESONANCE MAGNETOMETER UTILIZING THE SAME COIL FOR EXCITATION AND SIGNAL PICK-UP AND USING TOROIDAL SAMPLES

BACKGROUND OF THE INVENTION

This invention relates to nuclear magnetic resonance magnetometer, frequently referred to as NMRM, of the spin-coupling type in which the coils are associated with at least one sample of material containing a sub-particle having a gyromagnetic ratio and are connected to the input and to the output of a linear amplifier so as to form a loop in which the nuclear oscillation frequency is measured; the term "head" will be employed hereinafter to designate the assembly consisting of the coils and the samples which are associated therewith.

For the sake of simplicity, the term "sample" will be employed to designate a body of solvent containing in its molecule atomic nuclei which have non-zero magnetic moments and kinetic moments (therefore having a well-defined gyromagnetic ratio), said body of solvent being contained in a flask and a paramagnetic substance (such as an ion or a free radical having unpaired electrons) in solution in the body, said substance possessing at least one electron resonance line which is saturable by a high frequency electromagnetic field irrespective of the low magnetic field in which the sample is placed.

The invention more particularly relates to spin-coupling magnetometers which are intended to provide accurate measurement of low magnetic fields such as the earth's field whose average value is about 50,000 gamma (namely 0.5 Oe) or to detect variations of very small amplitude in said fields (about one-tenth of gamma for example).

In U.S. Pat. No. 3,441,838 assigned to the assignee of the present invention there is described a NMRM comprising two samples each associated with a pair of parallel coils and means for exciting two electron resonance lines of said two samples such that the saturation of one line produces an increase in energy absorption at the nuclear resonance frequency of the atomic nuclei of the solvent whilst saturation of the other line causes stimulated emission of energy at the nuclear resonance frequency of said solvent.

SUMMARY OF THE INVENTION

An object of the invention is to provide a magnetometer improved with respect to the NMRMs of the prior art, especially in respect of simplicity in design, signal-to-noise ratio and effects of changes in angular position.

According to one aspect of the invention, the magnetometer comprises: two samples subjected to the field to be measured and containing the same atomic nuclei having a non-zero magnetic moment and kinetic moment; two aligned coils each associated with a sample; means for producing an electromagnetic field at the electron resonance frequency which is sufficient to saturate one line of one of the samples so as to produce an increase in energy absorption at the resonant frequency of the atomic nuclei and one line of the other sample so as to produce an energy emission at said resonant frequency of the nuclei; a differential amplifier associated with the two coils, each coil being connected to a fixed reference voltage and to an input of the amplifier which is different in the case of the two coils in order that the parasitic voltages which are induced in the coils should appear in common mode and the output of the amplifier being connected to the inputs through equal impedances having a high value with respect to the impedance of the coils; and means for measuring the frequency at the output of the amplifier.

According to another aspect of the invention, the means for producing an electromagnetic field at the electron resonance frequency comprise a very-high-frequency generator, a resonant cavity comprising a central conductor which passes through the two coils along their axes and shielding consisting of strips which surround the samples and the coils, said shielding being joined to the shielding of the coaxial cable which extends from the generator.

BRIEF DESCRIPTION OF THE DRAWINGS

The invention will be better understood from the following description of a magnetometer which has no forbidden measuring axis and constitutes a non-limitative embodiment; the description refers to the accompanying drawings, in which.

Figure 1:
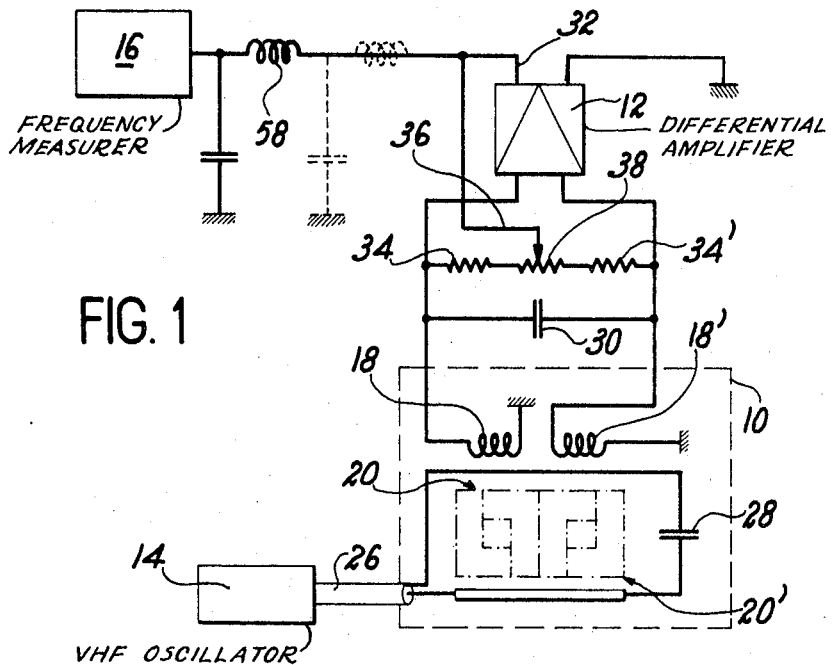
FIG. 1 is a highly diagrammatic block diagram of the magnetometer which makes use of two different samples and a single VHF generator.

The magnetometer which is illustrated diagrammatically in FIG. 1 comprises a measuring head 10 placed in the field to be measured having an intensity $H_o$, a differential loop amplifier 12 which is intended to produce a signal at the nuclear resonance frequency F which is imposed by the head 10, an oscillator 14 having a very high frequency $f$ which is intended to excite electron resonance lines of the samples of the head 10 and an apparatus 16 for measuring the frequency F.

The measuring head 10 can be regarded as being constituted by two similar assemblies in aligned relation. Each assembly is made up of a coil 18 or 18' which is wound concentrically with a sample 20 or 20'. For the sake of greater clarity, the coils are shown in FIG. 1 as being adjacent to the samples but the actual arrangement is that shown in FIG. 2. In this figure, it is apparent that each sample 20 or 20' is contained in two vessels. The left-hand assembly in FIG. 2, for example, comprises two concentric flasks 22 and 24 having a shape such as to form when positioned in interfitting relation a toric space which has a substantially square cross-section and in which the coil 18 is placed. The sample is constituted by:
— a solvent containing atomic nuclei having a non-zero magnetic moment and kinetic moment; these moments establish the gyromagnetic ratio γ of the nuclei, the resonant frequency $F$ of said nuclei in a field having an intensity $H_o$ being given by the formula:

$$F = (\gamma/2\pi)H_o$$

The atomic nuclei are usually protons but it is also possible to make use of other nuclei and in particular fluorine or phosphorus nuclei. In the first case, the solvent will usually be constituted by a hydrogenated liquid or by a mixture of water and a hydrogenated liquid which is miscible with water, this mixture being solidified only at low temperature;
— a paramagnetic substance in stable solution (ion or free radical comprising an unpaired electron in interaction with an atomic nucleus of the substance).

As shown in FIG. 1, one end of each of the two coils 18 and 18' is connected to ground; the other ends are connected to the inputs of the differential amplifier 12. Said amplifier must be substantially linear, this term being intended to mean in this case that a sinusoidal output signal corresponds to a sinusoidal input signal but does not imply that these signals are in phase. It is apparent that the harmful signals which could be generated in the identical coils 18 and 18' by the stray electromagnetic fields and the displacements of said coils across a magnetic field (this being the case of an airborne magnetometer) are applied to the amplifier in common mode. In consequence, provided that the rejection factor in common mode is sufficient, said harmful signals do not have any action. In the embodiment which is illustrated in FIG. 1, a tuning capacitor 30 is mounted between the ends of the coils 18 and 18' which are connected to the inputs of the amplifier 12 and said capacitor provides the input circuit with a quality coefficient Q which must not be excessive in order to prevent frequency-pulling phenomena. In practice, Q will be chosen to have a value between 7 and 10.

In contrast to spurious signals, the useful signals (electromotive forces collected by the coils 18 and 18' and derived from nuclear resonance phenomena) must be added. This result is achieved only if the macroscopic resultant of the magnetic moments of the system of atomic nuclei of one of the samples is in opposition to the macroscopic resultant of the magnetic moments of the system of atomic nuclei of the other sample. In the embodiment which is illustrated and which comprises a single VHF generator, these opposing effects must necessarily take place in response to an excitation at the same frequency in the case of both samples. Two samples which are different but have the same volume are accordingly employed for this purpose. It is possible in particular:

a. either to choose a sample with the same solvent but in which the paramagnetic substances are different and chosen so as to have two reversed electron lines substantially at the same excitation frequency. In the case of one of the samples (sample 20, for example), the substance is chosen so that the saturation of an electron resonance line at a frequency in the vicinity of $f$ by the electromagnetic field having the frequency $f$ should produce an increase in the energy-absorption intensity at the frequency of said line. In the case of the other sample, the substance is chosen so that the same frequency $f$ should excite an electron resonance line whose saturation produces a stimulated emission of energy at the frequency of said line.

By way of example, it is possible to employ as a first sample a solution of DTBN (ditertbutylnitroxide) in a mixture of 50 volume percent of water and 50 percent of acetone and as a second sample a solution of TANO (triacetonamine nitroxide) in a mixture consisting of 70 percent water and 30 percent ethylene-glycol: the application of an electromagnetic field at a frequency $f$ of the order of 68.5 Mc/s saturates the lower electron resonance line of the TANO, thereby increasing the absorption of energy by this latter, and saturates the higher electron resonance line of the DTBN at 69.4 Mc/s, this resulting in emission of energy by this latter.

b. or to choose the same free radical in different solvents: it is possible in particular to employ a first sample consisting of a solution having a concentration of $10^{-3}$ M of TANO (triacetonamine nitroxide) in pure DME (dimethoxyethane) and as a second sample a $10^{-3}$ M solution of TANO in a mixture of 73 percent DME and 27 percent water. Moreover, in order to reduce the thickness of the resonance lines and increase the amplitude of the signal, the TANO is advantageously deuterated. The optimum frequency of the excitation field is in that case approximately 62.65 Mc/s.

It is also possible to employ a first sample consisting of a solution having a concentration of $10^{-3}$ M of TANO in pure DME and a second sample consisting of a solution having a concentration of $10^{-3}$ M of TANO in pure methanol.

The output signals of the amplifier 12 are reinjected in the coils 18 and 18' which therefore perform a double function (collection of useful signals and reinjection). To this end, the output 32 of the amplifier 12 which is connected to the frequency-measuring apparatus 16 is connected in a loop with the inputs through two equal resistors 34 and 34', the value of which is high with respect to the impedance of the coils 18 and 18'. In order to permit accurate balancing of the head 10, the output is connected to the resistors 34 and 34' through a rheostat 38; the sliding contact 36 of the rheostat is connected to the output whilst its extremities are connected to the resistors. If the input circuit is tuned to resonance, the amplifier 12 must provide a phase shift of $\pi/2$ in order to maintain the low-frequency oscillation.

By way of example, the resistors 34 and 34' can have a value of 100 kilohms whilst the resistor 38 has a value of 1 kilohm. In regard to the tuning capacitor 30, this latter can have a value of a few thousand picofarads. The coils can have a few thousand turns (1,700 turns of 30/100 mm or 2,500 turns of 25/100 mm, for example). The gain of the amplifier 12 must be high such as 80 db, for example.

The electron resonance lines of the samples are excited by a single very-high-frequency oscillator 14 which drives by means of a coaxial cable 26 a resonant cavity which will be described below and encloses the two assemblies. Said cavity is tuned by means of an adjustable capacitor 28 having a value of a few hundred picofarads.

The principle of operation of the magnetometer is clearly brought out by the foregoing and will therefore be mentioned only in brief outline: the lines which are excited by the oscillator 14 in the samples result (in the presence of a magnetic field) in the appearance of a macroscopic magnetic moment having a given direction in the sample 20 and the opposite direction in the sample 20'; it accordingly follows that the macroscopic resultants of the magnetic moments of all the atomic nuclei of the samples 20 on the one hand and the samples 20' on the other hand are in opposite phase: in consequence, the electromotive forces arising from the nuclear resonance induced in the coils are added.

Figure 2:
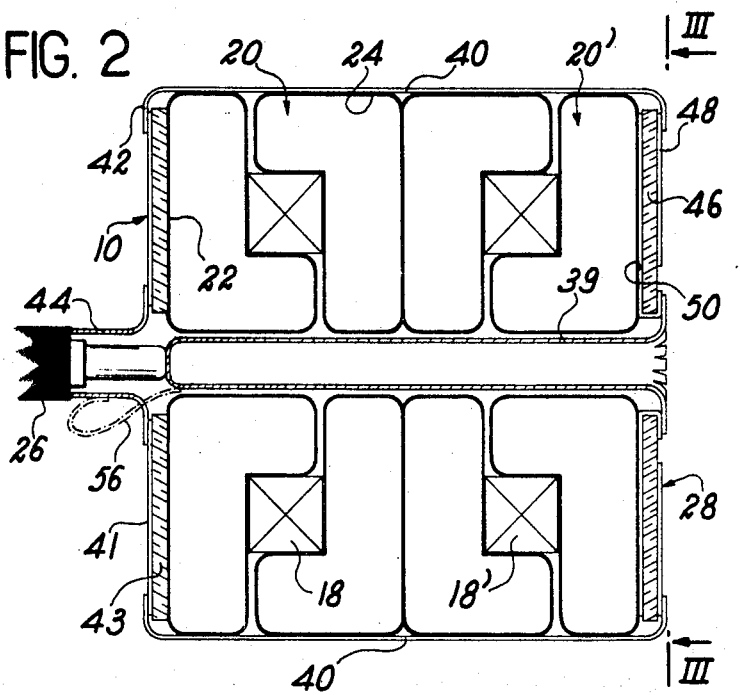
FIG. 2 shows diagrammatically the relative arrangement of the different components of a head which is intended for use in the magnetometer of FIG. 1, said head being shown in cross-section along the mid-plane thereof.
Figure 3:
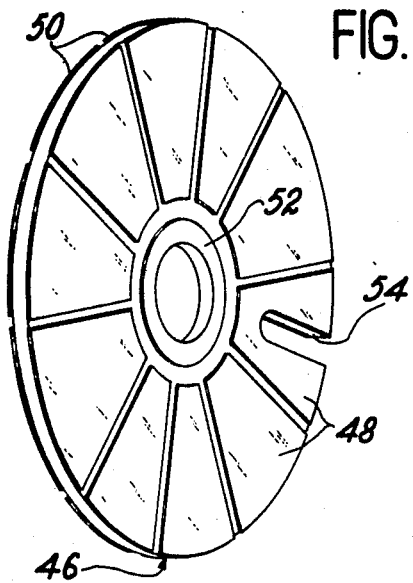
FIG. 3 shows diagrammatically in perspective the tuning capacitor of the high-frequency circuit, this view being taken along line III—III of FIG. 2.
Figure 4:
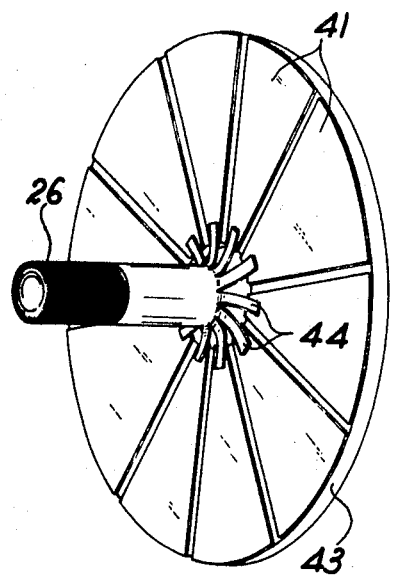
FIG. 4 shows in perspective the connections between the high-frequency cavity resonator and its coaxial supply.

The constructional design of the head 10 which is illustrated in FIGS. 2, 3 and 4 will now be described in greater detail: said head comprises two assemblies which are disposed symmetrically with respect to the central plane of the head and passed over the central conductor 39 of the cavity which resonates at the very high frequency delivered by the generator 14.

As has been stated in the foregoing, each of these assemblies comprises two Pyrex flasks (designated by the reference numerals 20 and 22 in the case of the left-hand assembly) and each flask contains an identical sample. It is not necessary to ensure that the flasks are machined in order to obtain a sufficient degree of precision. The coil of the assembly which is formed of enamelled silver wire molded in araldite and without a former is imprisoned between the flasks.

The flasks and the half-coil advantageously have a shape such that the flux produced by the half-coil should be of the same order throughout the mass of the sample. In fact, a flux which is too low results in a signal which is lower than the value which it is theoretically possible to obtain. A flux which is too high results in widening of the resonance lines and correlatively in reduction of the signal-to-noise ratio. It is evidently desirable to give the flux around the coil a value of the same order which is close to the optimum value. This criterion usually makes it necessary to adopt an approximately square cross-section for the coils and a cross-section which is also approximately square in the case of the samples with values of the same order around the entire coils.

The resonant cavity comprises the central conductor 39 and a shielding which is provided for the purpose of preventing circumferential eddy currents. Said shielding is made up of thin strips (foil) or thin deposits of highly conductive non-magnetic metal such as silver. The shielding comprises a series of thin longitudinal strips 40 which are applied against the juxtaposed flasks and is completed on each side of the samples by deposits formed on quartz discs. Provision is made on the same side as the coaxial cable 26 for silver-plated sectors 41 (shown in FIG. 4) which are placed on a thin quartz disc 43, the number of sectors being equal to the number of strips 40 which are bent back against the sectors and welded to these latter at 42 (as shown in FIG. 2). The shielding braid of the coaxial cable 26 is connected to the inner extremities of the sectors 41 by means of a series of tabs 44 disposed in a circle (as shown in FIGS. 2 and 4) whilst the core of the coaxial cable 26 is connected to the central conductor 39.

Similarly, a quartz disc 46 (shown in FIGS. 2 and 3) is placed symmetrically with the first against the sample 20'. Said disc performs the function of capacitor 28. For this purpose, the disc is provided on its outer face with silver-plated sectors 48 which are secured to the strips 40 and which stop short of the central hole of the disc. The other face of the disc 46 carries silver-plated sectors 50 of small thickness which are placed opposite to the sectors 48 and joined together at their inner extremities to a ring-shaped coating 52 which provides a connection with the exterior. The end portion of the central conductor 39 is fixed on the ring 52 (as shown in FIG. 2). Adjustment of the capacitor 28 is carried out simply by scraping the silver plating of the disc 46 to a greater or lesser extent. Matching of the cavity with the coaxial cable is carried out by means of a loop 56.

The disc 46 is provided with a slot 54 (shown in FIG. 3) for the insertion of nipples for filling the flasks of the right-hand assembly. A similar slot is formed in the disc 43. The disc 43 is adapted to carry a washer of insulating material (not shown in the figures) so as to provide an outlet for the conductors which extend from the coils. Said conductors pass between the flasks, then along the shielding 40 on the inside of this latter.

By reason of the fact that the coils 18 and 18' are placed within the interior of the resonant cavity, very-high-frequency currents are evidently induced therein. However, these currents present no difficulty since they can readily be eliminated by means of choke-coil filters 58 (as shown in FIG. 1) by reason of the difference between the frequencies F (from 1,000 to 3,000 c/s in the case of measurement of the terrestrial magnetic field with a proton magnetometer) and $f$ (of the order of 60 Mc/s).

The head which is illustrated in FIG. 2 has an advantageous property in that it does not have any forbidden measuring axis and can even deliver in a field of given intensity signals having an amplitude which is practically independent of the orientation of the head. In order to explain these properties (which it has been possible to confirm by experiment), indications which require only intuitive perception will alone be given since a rigorous demonstration would be complex.

Broadly speaking, there are employed for the purpose of producing a useful signal only those portions of samples which comply with three conditions:

the magnetic field produced by the current which flows within the coils as a result of re-injection must maintain within these latter the precession of spins of the atomic nuclei;

The very-high-frequency electromagnetic field must have a sufficient amplitude therein to saturate the electron resonance line of the sample;

The macroscopic resultant of the magnetic moments of the systems of nuclei must induce an electromotive force within the coils.

Figure 7:
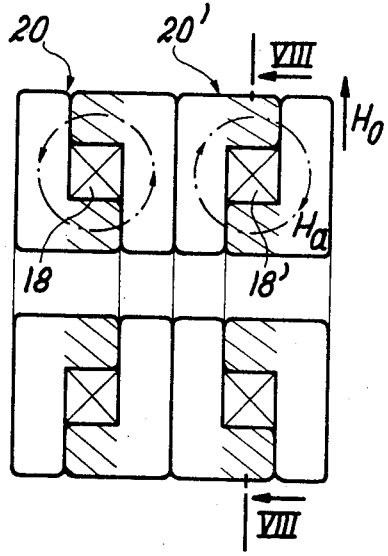
Figure 8:
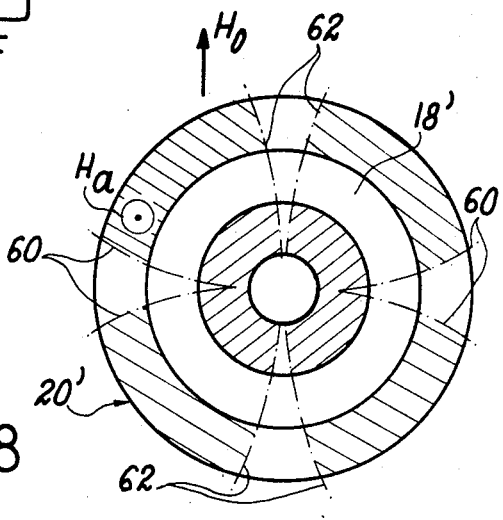

1. Referring now to FIGS. 7 and 8 which illustrate the case wherein the magnetic field $H_o$ to be measured is perpendicular to the axes of the coils, it is apparent that, in the zones located laterally with respect to the coils, the lines of force of the field $H_o$ to be measured and those of the alternating field $H_a$ produced by the current in the coils are substantially parallel. Under these conditions, the field of the coils cannot maintain the precession of the spins about the steady field $H_o$ to be measured. These zones do not therefore produce any action as is shown in FIG. 7.

On the contrary, the field $H_a$ is capable of maintaining the precession of the spins within the zones which are placed radially with respect to the coils both internally and externally of these latter (the zones shown in shaded diagonal lines in FIG. 7). The first condition is therefore satisfied. However, referring to FIG. 8, it is seen that in the case of certain portions of the sample which are placed radially with respect to the coil, one of the two other conditions is not satisfied.

On the one hand, by reason of the fact that the field $H_o$ is perpendicular to the axis, the mode of resonance of the cavity at very high frequency is such that the saturation of the electron resonance lines takes place only in two lobes representing a portion of the sample which is larger as the intensity of the field is higher: in FIG. 8, the curves 60 shown in chain-dotted lines delimit said lobes in respect of a particular intensity of the field.

Furthermore, there cannot be any induction in the coils when the spins precess about one direction (line of force of the field $H_o$) which passes through the axis of one coil: in consequence, a portion of the sample which is delimited in FIG. 8 by the chain-dotted lines 62 does not in turn take part in the production of the signal. In short, the only portions which perform this function are those which are shown in diagonal hatchings in FIG. 8.

2. If consideration is now given to the other extreme case, namely that in which the field $H_o$ is parallel to the axis (FIGS. 5 and 6), all those portions of the sample which are located within the non-shaded zones in FIG. 5 do not take part in the production of a signal: in these portions, the movement of precession of the spins is not maintained by the field $H_a$ which is produced by the coils since the lines of force of said field are parallel or substantially parallel to the field $H_o$ to be measured.

Figure 5:
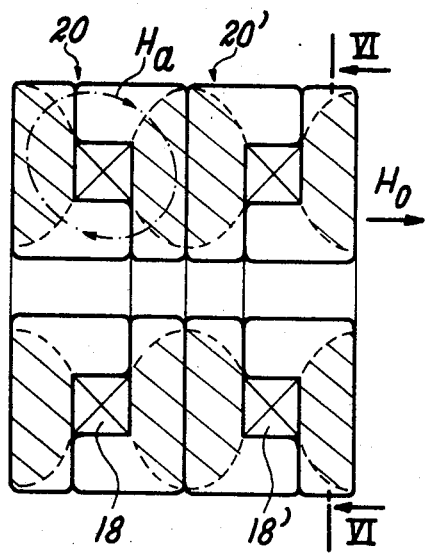
FIGS. 5 and 7 are explanatory diagrams in cross-section along the mid-plane of the head in which the zones of the sample which take part in the production of the signal respectively when the field $H_o$ to be measured is directed along the axis and at right angles to the axis are shaded in diagonal lines.
Figure 6:
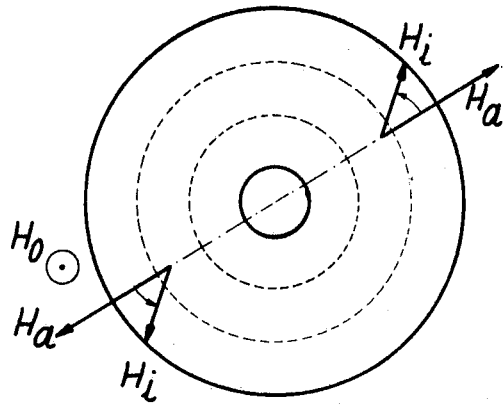
FIGS. 6 and 8 are explanatory diagrams constituted by cross-sections taken at the level of lines VI—VI of FIG. 5 and VIII—VIII of FIG. 7 respectively.

On the other hand, the movement of precession of the spins is evidently maintained in the shaded zones in FIG. 5. In consequence, in order that a signal should appear within each coil, it will only be necessary to ensure that the macroscopic resultant of the magnetic moments of the system of atomic nuclei in a given zone on one side of the axis of the coil induces currents having the same direction as those which arise from the macroscopic resultant of the magnetic moments of the system of nuclei which is located in a zone diametrically opposite to the first. In FIG. 6, it is apparent that, at points at which the lines of force of the field $H_a$ are radial, the alternating field $H_a$ can be split into two vectors rotating with a frequency which corresponds to the nuclear resonance frequency. One of these vectors does not have any effect since the corresponding field behaves as a pulsating quantity $-2\pi f$ with respect to a filter (nuclear filter) which is tuned to the pulsation $+2\pi f$. There only remain the fields $H_1$ which are of opposite direction (FIG. 6) in opposite zones. In other words, the resultants of the projections of the rotation of spins in the plane of FIG. 6 and in opposite zones of the sample are vectors of opposite direction (the direction of rotation of the vectors $H_1$ being nevertheless the same). It can also be considered that the spins behave in the case of each coil as phase-displaced rotating dipoles which are placed opposite to the coil: they therefore induce a resultant current. The action of the spins which are placed within zones having substantially the same diameter as that of the coil is evidently preponderant; those zones which are located laterally with respect to the coil and have either a smaller or a larger diameter nevertheless make a contribution which is not negligible.

A further aspect deserves mention and, although secondary, is nevertheless very important: when the measured field $H_o$ has the orientation shown in FIGS. 5 and 6, the head does not exhibit any gyromagnetic effect or, in other words, the frequency of the signals which appear at the terminals of the half-coils remains the nuclear magnetic resonance frequency $f = (\gamma/2\pi)H_o$ irrespective of the movements of rotation to which the head may be subjected. Moreover, the movements of rotation of the coil about its axis do not induce any gyromagnetic effect as was in fact the case with magnetic heads of the prior art which had a single forbidden axis, namely the heads described in U.S. Pat. No 3,441,838 which has already been cited. When the magnetometer is mounted on board a machine such as an aircraft whose most abrupt movements of rotation take place in rolling motion, the two properties mentioned above enable the head to be arranged with its axis along the axis of said rolling motion irrespective of the inclination of the terrestrial magnetic field to be measured since there no longer remains any forbidden axis. The advantage of the magnetometer in accordance with the invention will be especially apparent near the equator where the lines of force of the terrestrial magnetic field are practically horizontal. This fact had previously made it impossible to place a head having a single forbidden axis under conditions which permitted elimination of the gyromagnetic effect in rolling motion.

Moreover, since the gyromagnetic effect is nonexistent in the case of any movement of rotation of the head about its axis and plays a part only in respect of that component of the field $H_o$ to be measured which is not parallel to the axis, this effect will be appreciably smaller in comparison with heads of the prior art in the case of all orientations of the field $H_o$ except those which are perpendicular to the axis.

It is now apparent that the magnetometer according to the invention in fact offers the advantages which were mentioned earlier: the constructional design is very simple and does not entail the need for machining of flasks, the head does not have any forbidden axis, the gyromagnetic effect is attenuated. So far as the latter point is concerned, it is worth noting that a choice can be made between two qualities of the head inasmuch as it may prove desirable either to obtain a signal which has a practically constant amplitude irrespective of the orientation of the head and which consequently entails the need for uniform distribution of the samples around the coils or on the contrary to obtain a high attenuation of the gyromagnetic effect by reducing the volume of samples placed radially with respect to the coils. Moreover, the coefficient of filling of the head (proportion of the volume of the head which is occupied by the samples) is very high. The shielding which is placed around the coils constitutes a screen which on the one hand protects equipment located outside the head from the low-frequency radiation of this latter and, on the other hand, protects the coils from the action of external fields.

We claim:

1. A nuclear magnetic resonance magnetometer of the spin-coupling type comprising:

two samples located close to each other in the magnetic field to be measured and containing the same atomic nuclei having non-zero magnetic moment and kinetic moment and a paramagnetic substance having at least an electronic resonance line saturable by an electromagnetic field;

two axially aligned identical excitation and pick-up coils each associated with a respective one of said samples, each of said samples comprising a hollow toroid with each coil located within the hollow portion of the toroid;

means for producing an electromagnetic field coupled with said samples to saturate an electron resonance line of one of the samples to produce an increase in energy absorption at the resonant frequency of the atomic nuclei and an electron resonance line of the other sample to produce an energy emission at said resonant frequency of the atomic nuclei;

a differential amplifier associated with said two coils, one terminal of each coil being connected to a fixed reference voltage and the other terminal of each coil being connected to a respective input of the amplifier whereby the parasitic voltages which are induced in the coils appear in common mode and the output of the amplifier being connected to the inputs thereof through respective impedances having a same value which is large with respect to the impedance of the coils; and means for measuring the frequency at the output of said amplifier.

2. A magnetometer according to claim 1, wherein the amplifier provides a phase shift of $\pi/2$ and a resonance tuning capacitor is connected between the inputs of the amplifier.

3. A nuclear magnetic resonance magnetometer of the spin-coupling type comprising: two samples located close to each other in the field to be measured and containing the same atomic nuclei having non-zero magnetic moment and kinetic moment and a paramagnetic substance having at least an electronic resonance line saturable by a VHF electromagnetic field;

means for saturating one line of one of the samples so selected as to increase the energy absorption at the resonant frequency of the atomic nuclei and for saturating one line of the other sample so selected as to increase the energy emission at said resonant frequency of the atomic nuclei;

a resonant circuit comprising a low-frequency amplifier and at least two identical coils each electromagnetically coupled with one of said samples and connected to the amplifier, each of the samples comprising a hollow toroid with each coil located within the hollow portion of the toroid; and means for measuring the resonant frequency in said resonant circuit.

4. A magnetometer according to claim 3, wherein the cross-section taken axially through the toroid of each sample is rectangular or square.

5. A magnetometer according to claim 4, wherein each toroidal sample consists of two annular flasks limiting a closed annular space for the corresponding coil.

6. A magnetometer according to claim 4, wherein each coil has a substantially square axial cross-section.

7. A magnetometer according to claim 1, wherein the means for saturating the electron resonance lines comprises: a VHF resonant cavity consisting of a central conductor located along the axis of the coils and of a shielding which encloses the samples and the coils, said shielding being formed by thin metal strips of high electrical conductivity; and a very-high-frequency generator connected to said cavity by a coaxial cable having a central line connected to the central conductor of the cavity and a shielding which is connected to said conductive strips.

8. A magnetometer according to claim 7, having a cavity-tuning capacitor consisting of a flat quartz disc which is applied against one of the samples and has the same diameter as said sample, said disc having coatings of conductive metal on the opposite faces thereof, the deposits formed on one of the faces being connected to the central conductor of the cavity and the deposits formed on the other face being connected to the conductive strips.

9. A magnetometer according to claim 1, wherein one of the samples is constituted by TANO in a $10^{-3}$ M solution in pure DME and wherein the other sample is constituted by TANO in a $10^{-3}$ M solution in pure methanol and said means comprise a single VHF generator.

10. A proton magnetometer according to claim 9, wherein the TANO is deuterated.

11. A nuclear magnetic resonance magnetometer of the spin-coupling type comprising:

two samples located close to each other in the magnetic field to be measured and containing the same atomic nuclei having non-zero magnetic moment and kinetic moment and a paramagnetic substance having at least an electron resonance line saturable by a VHF electromagnetic field;

two axially aligned identical coils each associated with a respective one of said samples;

means for producing an electromagnetic field coupled with said samples to saturate an electron resonance line of one of the samples so as to produce an increase in energy absorption at the resonant frequency of the atomic nuclei and an electron resonance line of the other sample so as to produce an energy emission at said resonant frequency of the atomic nuclei;

a resonant circuit for sustaining the nuclear magnetic resonance of said nuclei, comprising a low frequency amplifier and at least said two coils each electromagnetically coupled with one of said samples and connected to said amplifier; and means for measuring the resonance frequency in said loop;

wherein the means for producing an electromagnetic field at the electron resonance frequency comprise a single VHF oscillator, a resonant cavity, and a coaxial cable, said cavity having a central conductor disposed along the common axis of the coils and a shielding which encloses the samples and the coils and is formed by longitudinal strips of highly electrically conductive metal and said coaxial cable having an inner conductor line which is connected to said central conductor and an outer shielding which is connected to said strips.

* * * * *